(12) United States Patent
Trinick

(10) Patent No.: US 9,364,885 B2
(45) Date of Patent: *Jun. 14, 2016

(54) METHOD FOR FORMING A JOINT

(71) Applicant: Henrob Limited, Flintshire (GB)

(72) Inventor: Russell John Trinick, Flintshire (GB)

(73) Assignee: Henrob Limited, Flintshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,612

(22) Filed: Oct. 31, 2014

(65) Prior Publication Data

US 2015/0239034 A1    Aug. 27, 2015

Related U.S. Application Data

(63) Continuation of application No. 13/298,466, filed on Nov. 17, 2011, now Pat. No. 8,898,880, which is a continuation of application No. 12/300,630, filed as application No. PCT/GB2007/001725 on May 10, 2007, now Pat. No. 8,070,406.

(30) Foreign Application Priority Data

May 13, 2006 (GB) .................................. 0609580.6

(51) Int. Cl.
B21J 15/02 (2006.01)
F16B 19/08 (2006.01)

(52) U.S. Cl.
CPC ............. B21J 15/025 (2013.01); F16B 19/086 (2013.01); *Y10T 29/49835* (2015.01); *Y10T 29/49837* (2015.01); *Y10T 29/49943* (2015.01);

(Continued)

(58) Field of Classification Search
CPC ................. B23P 19/064; B21J 15/025; Y10T 29/49956; Y10T 29/49943; Y10T 29/49837; F16B 37/065; F16B 37/068; F16B 37/06; F16B 19/086; F16B 15/04; F16B 19/06
USPC ........................................................ 411/179
See application file for complete search history.

(56) References Cited

U.S. PATENT DOCUMENTS 6,325,584 B1    12/2001    Marko et al.
6,385,843 B1    5/2002    Singh et al.

(Continued)

FOREIGN PATENT DOCUMENTS

DE        20319610 U1     3/2004
DE     202006013981 U1    11/2006

(Continued)

*Primary Examiner* — Jermie Cozart
(74) *Attorney, Agent, or Firm* — Michael Best & Friedrich LLP

(57) ABSTRACT

A method for forming a joint in at least one high strength sheet steel having a UTS in the range 200 to 1400 MPa using a self-piercing rivet includes the steps of: positioning the sheet material over a die and providing a rivet having a substantially cylindrical shank and a head, the shank having a central blind bore and an annular piercing end spaced from said head. The ratio of the difference between the outside and inside diameters of the shank in the region around the bore to the outside diameter of the shank is in the range 0.47 to 0.52. The method also includes positioning a rivet over the sheet material at a position opposite the die and using a punch to set the rivet and force it into the sheet material such that it pierces the upper surface thereof and such that the shank deforms outwardly to interlock with the material but without penetration to the die side of the material.

15 Claims, 6 Drawing Sheets

(52) U.S. Cl.
CPC ...... *Y10T29/49947* (2015.01); *Y10T 29/49956* (2015.01); *Y10T 29/5343* (2015.01); *Y10T 29/5377* (2015.01); *Y10T 403/4974* (2015.01); *Y10T 403/4991* (2015.01)

(56) References Cited

U.S. PATENT DOCUMENTS

| | | | |
|---|---|---|---|
| 6,663,329 | B2 | 12/2003 | Singh et al. |
| 6,988,862 | B1 | 1/2006 | Iguchi et al. |
| 7,762,753 | B2 | 7/2010 | Jokisch |
| 8,070,406 | B2* | 12/2011 | Trinick ............ B21J 15/025 29/525.01 |
| 8,898,880 | B2* | 12/2014 | Trinick ............ B21J 15/025 29/432.1 |
| 2005/0086799 | A1 | 4/2005 | Kato et al. |
| 2007/0104553 | A1 | 5/2007 | Philipskotter et al. |

FOREIGN PATENT DOCUMENTS

| | | |
|---|---|---|
| DE | 102005052360 A1 | 5/2007 |
| EP | 0720695 | 7/1996 |
| EP | 1387093 A1 | 2/2004 |
| JP | 09317730 | 9/1997 |
| JP | 2000205213 | 7/2000 |
| JP | 2003191041 | 8/2003 |
| JP | 2004060855 | 2/2004 |
| JP | 2009537757 | 10/2009 |
| ZA | 9108340 A | 7/1992 |

* cited by examiner (PRIOR ART) Fig. 11d
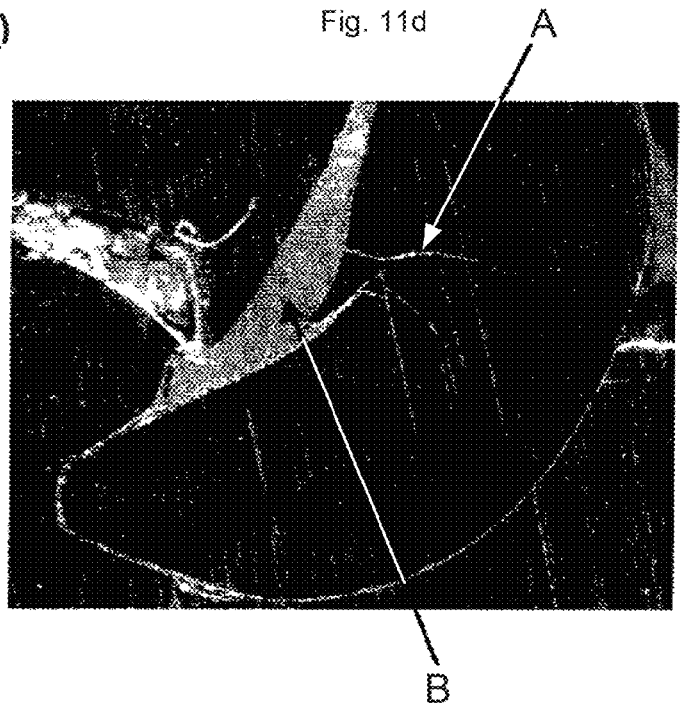
(PRIOR ART) Fig. 11e
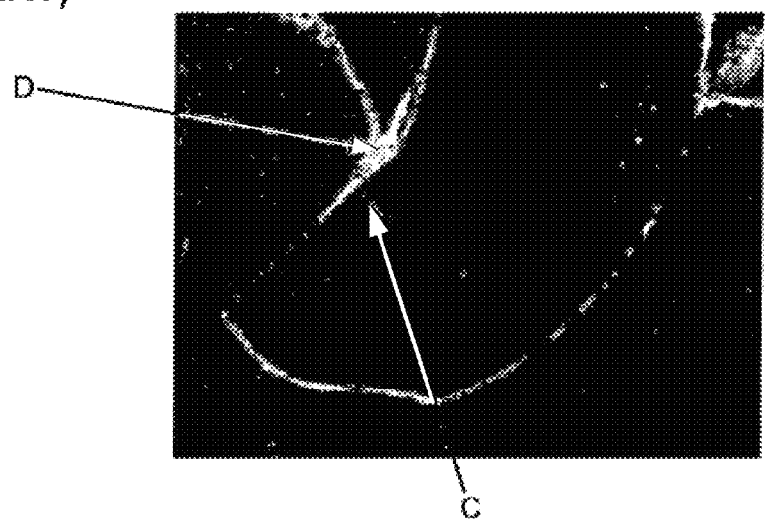

METHOD FOR FORMING A JOINT

RELATED APPLICATION DATA

This patent application is continuation of U.S. patent application Ser. No. 13/298,466 filed Nov. 17, 2011, now U.S. Pat. No. 8,898,880, which is a continuation of U.S. patent application Ser. No. 12/300,630 filed Nov. 12, 2008, now U.S. Pat. No. 8,070,406, which is a national stage filing under 35 U.S.C. 371 of International Application No. PCT/GB2007/001725, filed 10 May 2007, which claims priority to British Patent Application No. 0609580.6, filed 13 May 2006, the entire contents of which are incorporated herein by reference.

DETAILED DESCRIPTION

The present invention relates to a self-piercing rivet and more particularly to a self-piercing rivet of the kind that is inserted into sheet material without full penetration such that a deformed end of the rivet remains encapsulated by an upset annulus of the sheet material. The invention also relates to a riveting method and a system for the insertion of such a rivet.

Self-piercing rivets of the kind defined above, and methods and apparatus for inserting such rivets into sheet material are well known.

U.S. Pat. No. 6,385,843 discloses a self-piercing rivet that has proved commercially successful. The rivet has a deep central bore with a rounded base and a conical entrance having a generally curved surface.

U.S. Pat. No. 6,325,584 shows a partially hollow self-piercing rivet for joining aluminum sheet. The rivet is specifically designed to be made of light metal with low tensile strength and has a central bore that is shallow and conical. The piercing end of the rivet is as blunt as possible in order to preclude the possibility of early deformation during the insertion process. The rivet shank is compressed significantly in the finished joint.

DE 203196100 discloses a self-piercing rivet designed particularly for insertion into high strength steel sheets. The rivet has a deep bore and is formed from a high strength material. The rivet has a particular configuration at the piercing end with a piercing edge disposed between the inner and outer surfaces of the shank and disposed radially outside the middle of the shank. The inner surface, around the entrance to the bore, has a curved profile. The rivet shank is compressed significantly in the finished joint.

A known self-piercing rivet is illustrated in FIGS. 1 and 2 of the accompanying drawings. As shown in FIG. 1, the rivet 1 is partially hollow with a head 2 and a cylindrical shank 3 that terminates in an annular edge 4. As the rivet is driven into two overlapping sheets of material 5, 6 over a suitably shaped die (not shown), the shank is caused to flare outwardly into the shape illustrated in FIG. 2. The sheets of material 5, 6 are caused to deform around the shank, creating an annulus that encapsulates the shank. The shank 3 and edge 4 of the rivet remain embedded in the sheet material 5, 6 after the rivet has been set. Self-piercing riveting enables sheet material to be joined without the requirement for the pre-drilling or pre-punching of a hole in the material.

Self-piercing riveting has been used to great success in the automotive industry where light-weight materials, such as aluminum, have been adopted for vehicle body panels in the interests of weight reduction and therefore reduced energy consumption. Aluminum is difficult or not feasible to spot weld, particularly to steel, owing to its high thermal conductivity, low melting range and propensity to form oxide surface film. Self-piercing rivets of the kind shown in FIGS. 1 and 2 have been used in joining such panels with little visible distortion on the exposed panel surfaces. Since the lower sheet is not pierced there is a reduced risk of corrosion occurring in the completed joint. More recently in the automotive industry there has been a move to using high strength or ultra high strength steels, such as "Docol DP/DL" available from SSAB Tunnplat AB in Sweden, which allow further weight reduction. It is desirable to be able to use self-piercing rivets in joints made with high strength steel or indeed thick stack sheet steel without compromising joint strength or introducing defects or corrosion points. The high strength/greater stiffness of this kind of sheet material combination makes this difficult in that the rivet experiences higher forces during the setting operation. Conventional self-piercing rivets are not capable of withstanding these higher forces required to pierce such materials in such a way that the rivet deforms in a controllable manner to ensure that the final joint is satisfactory. Simply making the rivet from higher strength material does not generally achieve the desired results as the corresponding reduced ductility can cause cracking of the shank as it attempts to flare during insertion. In order to form a suitable joint with satisfactory strength and corrosion resistance, the shank of the rivet needs to have sufficient column strength to pierce the top sheet of material without buckling, but yet flare outwardly during insertion in a repeatable and predictable manner without tearing or cracking in order to form a satisfactory joint.

One problem with steel is that, for a given grade, parameters such as strength and ductility can vary between batches and between manufacturing sources. It is therefore important that any rivet design should be capable of accommodating such variations.

It is also desirable to have a rivet design that is capable of being used with different combinations of thick and thin sheets.

A typical undesirable joint produced with a conventional self-piercing rivet is shown in FIG. 3. It will be appreciated from a brief inspection that the degree of flare of the shank is not symmetric around the rivet, the shank has been compressed and has buckled such that there is a clearance (A) between the shank and the sheets and there is separation (B) of the sheets. Cracking of the rivet shank is also evident (E). These all contribute to compromising of the joint strength, particularly dynamic strength. Other factors that are to be avoided are cracking of the rivet on the underside of the head (area C) and at the intersection of the wall of the shank with the base of the bore (area D).

It is also desirable that the self-piercing rivet geometry is such that it can be used with existing self-piercing riveting setters and feeders. This means that the diameter of the head of the rivet should be equivalent to that of existing rivets the setter and feeders are designed to handle. Moreover, riveted products are currently being designed on the basis of existing rivet sizes taken from numerous design guidelines and references. Simply scaling up the rivet size is therefore not a desirable solution.

It is an object of the present invention to obviate or mitigate this and other disadvantages and to provide for a self-piercing rivet that is suitable for use in joining high strength steel and/or thick stack steel sheet combinations.

According to a first aspect of the present invention there is provided a self-piercing rivet comprising a substantially cylindrical shank having an outside diameter and a head, the shank having a central blind bore defining an inside diameter and an annular piercing end spaced from said head, characterized in that the ratio of the difference between the outside and inside diameters of the shank in the region around the bore to the outside diameter of the shank is in the range 0.47 to 0.52.

The ratio of the cross sectional area of the shank in the region around the bore to the outside diameter of the shank may be in the range 3.0:1 to 3.6:1 and more preferably the ratio is 3.1:1.

The ratio of the diameter of the head to the outside diameter of the shank may be in the range 1.35:1 to 1.47:1 or may be 1.4:1.

The ratio of the effective length of the rivet to the depth of the bore may be in the range 1.56 to 2.4.

For a given length of rivet the ratio of the effective rivet length to depth of the bore has been found to be most effective if it is greater than compared to a rivet of conventional design. This enhances the stability of the rivet shank thereby reducing the tendency for the rivet to collapse and the tendency for asymmetric flaring of the shank during rivet insertion.

The annular piercing end may have a first portion, which may be substantially flat portion, and a second portion in the form of a conical taper that may define an included angle of substantially 90 degrees. The first portion may define a surface that is generally disposed such that it is inclined at an angle of between 0.degree. and 10.degree. to the perpendicular to the central axis of the rivet (i.e. its longitudinal axis)

An upper portion of the shank immediately below the head has a transition region forming a smooth intersection with the head. The transition region may have a radius of curvature in the range 0.8 to 1.2 mm or 0.9 to 1.1 mm. Alternatively, the transition region may have a radius of curvature of 1 mm.

The rivet may be made from typical fastener grade steel such as BS EN 10263 and subsequently heat treated to a hardness of at least 350 Hv. It may alternatively be made from an aluminum alloy or stainless steel. The shank of the rivet may have an outside diameter of 5.5 mm and the cross sectional area of the shank in the region around the bore may be 17.15 mm$^2$.

According to a second aspect of the present invention there is provided a self-piercing rivet comprising a substantially cylindrical shank having an outside diameter and a head, the shank having a central blind bore defining an inside diameter and an annular piercing end spaced from said head wherein the annular piercing end has a substantially flat portion and a conical taper and the ratio of the length of the flat portion to the thickness of the shank is in the range 0.33 to 0.66. Alternatively it may be in the range 0.4 to 0.7:1 or 0.5 to 0.7:1.

According to a third aspect of the present invention there is provided a self-piercing rivet comprising a substantially cylindrical shank having an outside diameter and a head, the shank having a central blind bore defining an inside diameter and an annular piercing end spaced from said head wherein the annular piercing end has a first portion radially outboard of a second portion that is in the form of a conical taper and the ratio of the length of the first portion to the thickness of the shank is in the range 0.4 to 0.7:1.

The ratio of the length of the first portion to the thickness of the shank may be 0.6:1.

The annular conical taper may define an included angle of substantially 90 degrees.

According to a fourth aspect of the present invention there is provided a method for forming a joint in at least one high strength sheet steel having a UTS in the range 200 to 1400 MPa using a self-piercing rivet comprising the steps of: positioning the sheet material over a die; providing a rivet having a substantially cylindrical shank and a head, the shank having a central blind bore and an annular piercing end spaced from said head, ratio of the thickness of the shank in the region around the bore to the outside diameter of the shank is in the range 0.47 to 0.52; positioning a rivet over the sheet material at a position opposite the die; using a punch to set the rivet and force it into the sheet material such that it pierces the upper surface thereof and such that the shank deforms outwardly to interlock with the material but without penetration to the die side of the material.

According to a fifth aspect of the present invention there is provided a method for forming a joint between at least one high strength sheet steel having a UTS in the range 200 to 1400 MPa and a sheet of different material using a self-piercing rivet comprising the steps of: positioning the sheet material over a die; providing a rivet having a substantially cylindrical shank and a head, the shank having a central blind bore and an annular piercing end spaced from said head, ratio of the thickness of the shank in the region around the bore to the outside diameter of the shank is in the range 0.47 to 0.52; positioning a rivet over the sheet material at a position opposite the die; using a punch to set the rivet and force it into the sheet material such that it pierces the upper surface thereof and such that the shank deforms outwardly to interlock with the material but without penetration to the die side of the material.

The total thickness of the stack of material being joined may be in the range 4 mm to 18 mm. The sheet of high strength steel may have a thickness in the range 1 to 4 mm. Alternatively, it may be no greater than 6 mm.

According to a sixth aspect of the present invention there is provided a method for forming a joint in a plurality of sheets of material, the combined thickness of the sheets being in the range 4 mm to 18 mm using a self-piercing rivet comprising the steps of: positioning the sheet material over a die; providing a rivet having a substantially cylindrical shank and a head, the shank having a central blind bore and an annular piercing end spaced from said head, ratio of the thickness of the shank in the region around the bore to the outside diameter of the shank is in the range 0.47 to 0.52; positioning a rivet over the sheet material at a position opposite the die; using a punch to set the rivet and force it into the sheet material such that it pierces the upper surface thereof and such that the shank deforms outwardly to interlock with the material but without penetration to the die side of the material.

According to a seventh aspect of the present invention there is provided a rivet insertion system comprising a punch for applying an insertion force to a rivet, a die into which the material being riveted is deformed and a rivet as defined above.

Specific embodiments of the present invention will now be described, by way of example only, with reference to the accompanying drawings in which:

FIG. 11D is a close up of part of the joint shown in FIG. 11A; and

FIG. 11E is a close up of part of the joint shown in FIG. 11B.

Figure 1:
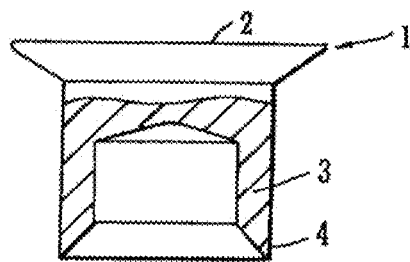
FIG. 1 is a part-sectioned view showing a prior art self-piercing rivet.
Figure 2:
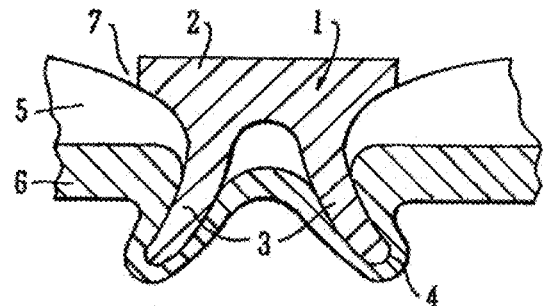
FIG. 2 is a is a sectioned view showing a riveted joint in overlapping sheets of material made using the self-piercing rivet of FIG. 1.
Figure 3:
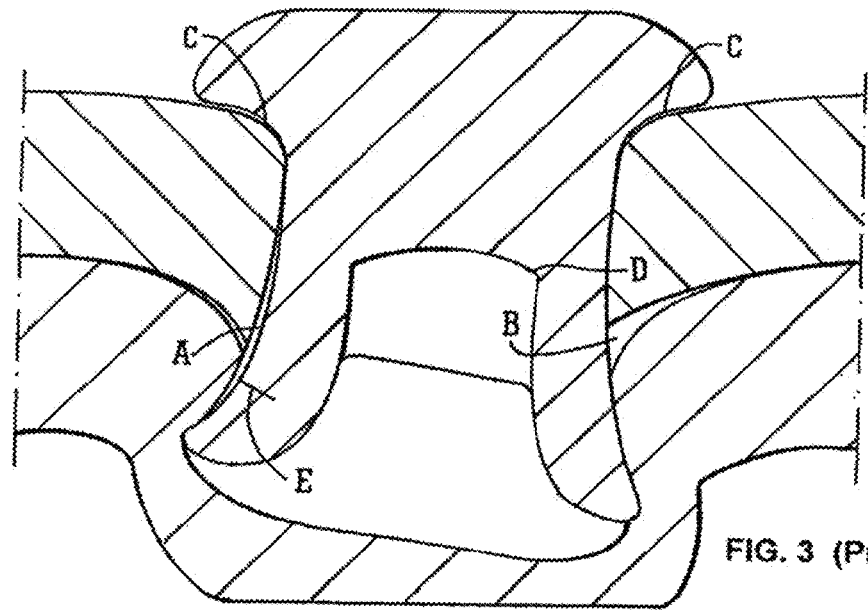
FIG. 3 illustrates an undesirable self-piercing riveted joint.
Figure 4:
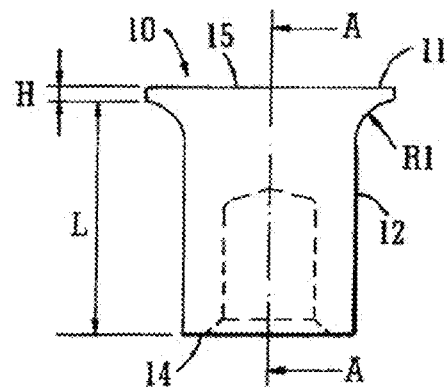
FIG. 4 shows a first embodiment of a self-piercing rivet according to the present invention.
Figure 5:
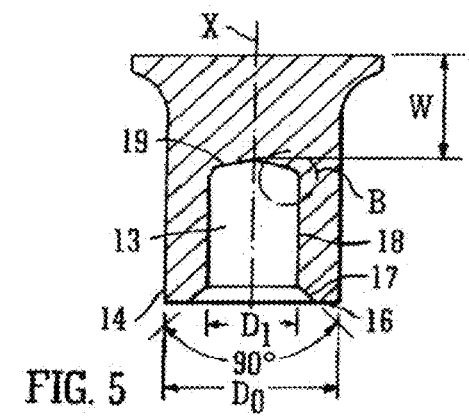
FIG. 5 represents a section through the rivet of FIG. 4 along line A-A.
Figure 6:
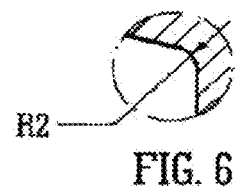
FIG. 6 is a close-up view of the area of the rivet labeled B in FIG. 5.

Referring now to FIGS. 4 to 6 of the drawings, the exemplary self-piercing rivet 10 is substantially cylindrical with a head portion 11 that extends radially outwards from a depending shank 12 that is partially hollow so as to define a central bore 13. The shank has a piercing end 14 distal from the head.

The head portion 11 of the rivet 10 has a substantially constant diameter of depth H that is integrally formed with an upper end of the shank 12 and a planar upper surface 15 to which a force is applied to insert the rivet into the workpiece. The rivet is configured such that in the final joint this upper surface 15 is substantially flush with the surrounding surface of the workpiece. The upper end of the shank flares outwardly with a radius R1 to meet with the underside of the head. This radius R1 serves as a transition surface between the head 11 and the shank 13. The rivet has an overall length of H+L where H is the depth of the head and L is what is known as the effective length of the rivet which comprises the length of the transitional radius R1 in the direction along the axis X of the rivet and the length of the shank 13.

Figure 5A:
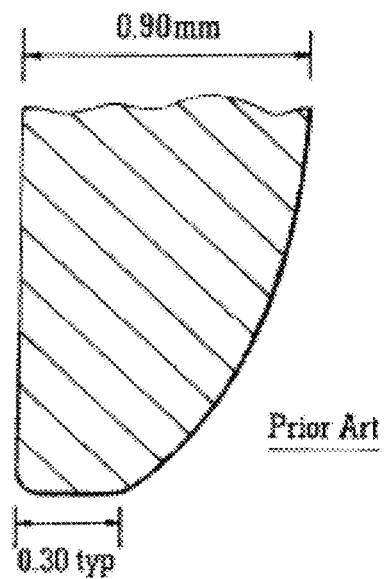
FIG. 5A is a close-up view of part of a piercing end of the rivet of FIGS. 4 and 5 depicted alongside the corresponding part of a prior art rivet for comparison.
Figure 5A:
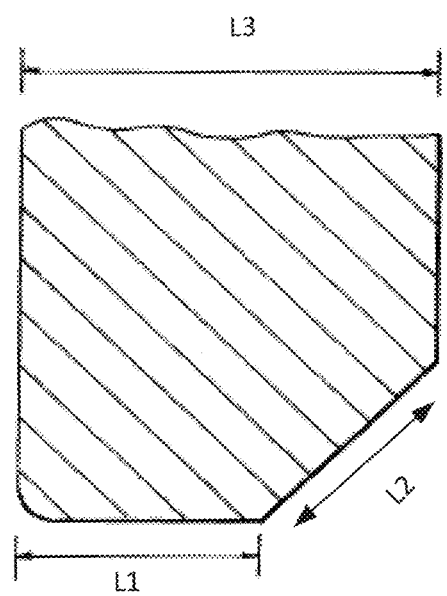

The piercing end 14 of the rivet comprises an annular piercing edge 16 that defines a flat surface extending in a plane substantially parallel to that occupied by the upper surface 15 of the head and a radially inboard conical taper 17 that extends inwardly to meet with the bore 13. The taper has an included angle of 90 degrees that forms a transition between the flat surface and the bore 13 in the shank 12. When viewed in section, as illustrated in FIG. 5A, the thickness of the flat surface on each side of the section is L1, the length of the taper is L2 and the overall thickness of the shank wall is L3. The inside surface 18 of the shank that defines the bore is of substantially constant diameter throughout most of its length save for its base 19. The base 19 is very slightly conical and there is an arcuate transition of radius R2 between the periphery of the base 19 and the inside surface of the shank 18 as best seen in FIG. 6.

In FIG. 5A the piercing end of the rivet is shown alongside that of a commercially available rivet (depicted on the left) of the corresponding size and of the kind described in U.S. Pat. No. 6,385,843. In comparing the two it will be noted that the piercing edge 16 is significantly longer in the present rivet compared to the prior art rivet and the conical taper 17 is provided by a discrete surface rather than a curved transition into the bore. The exact form of the piercing edge 16 and conical taper 17 may vary. In particular, the piercing edge 16 may be in the form of a surface that is not flat but is rather arcuate or convex. A suitable radius may be provided at the intersections between the piercing edge 16 and the outside surface of the shank and/or the conical taper 17. Moreover, the surface defined by the piercing edge 16 need not necessarily be disposed in a plane perpendicular to the central axis of the rivet but may be inclined at an angle in the region of up to 10 degrees to that plane.

It will be seen that the rivet has an upper solid portion defined by a distance W between the top surface 15 of the rivet head 11 and the base 19 of the central bore 13 of the shank (see FIG. 5), and a hollow portion provided by the bore.

A table showing different possible values of effective rivet length L and the depth of the solid portion, W is shown below:

| "L" | "W" |
|---|---|
| 5 | 2.5 |
| 6 | 3.0 |
| 7 | 3.0 |
| 8 | 3.5 |
| 9 | 4.5 |
| 10 | 5.5 |
| 11 | 6.5 |
| 12 | 7.5 |
| 14 | 9.5 |

In each case the transition radius R1 of the lower part of the head is 1.0 mm and the transition radius R2 at the base of the bore is 0.4 mm. The transition radius R1 does not extend over a full 90 degree arc.

Figure 7:
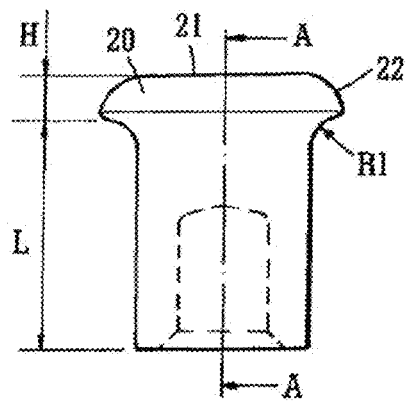
FIG. 7 is a second embodiment of a self-piercing rivet according to the present invention.
Figure 8:
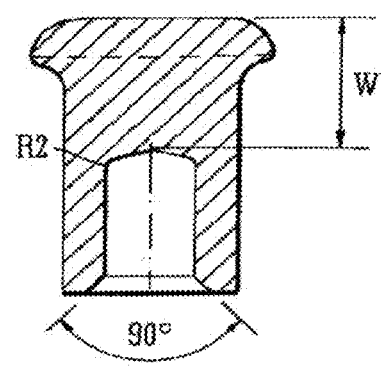
FIG. 8 is a sectioned view through the rivet of FIG. 7 along line A-A.

The alternative rivet design of FIGS. 7 and 8 differs only in the shape of the head. In this embodiment, the head 20 in larger and is designed to stand proud from the workpiece into which it is inserted. The upper surface 21 of the head has a planar central portion and an arcuately tapered periphery 22. For this rivet type, examples of the measurements L and W are shown in the table below:

| "L" | "W" |
|---|---|
| 5 | 3.5 |
| 6 | 4.0 |
| 7 | 4.0 |
| 8 | 4.5 |
| 9 | 5.5 |
| 10 | 6.5 |
| 11 | 7.5 |
| 12 | 8.5 |
| 14 | 10.5 |

In each case the transition radius R1 at the head is 1.0 mm and the transition radius R2 in the bore is 0.4 mm.

For each of the rivet embodiments, the thickness or the cross-sectional area of the shank in the region where it is hollow is greater for the rivet of the present invention than compared to that of a conventional self-piercing rivet. This provides an improvement in the column strength of the rivet shank providing greater resistance to the onset of compression or buckling. However, it has been determined that the precise thickness needs to be carefully controlled in order to avoid both insufficient and excess flaring of the shank and thereby ensure that the rivet is capable of forming good quality joints in high strength steel. Moreover, it has been realized that the best results are obtained with a rivet in which the greater shank thickness in comparison to corresponding prior art rivets is achieved by increasing the outside diameter of the shank (without a corresponding increase in the diameter of the rivet head) rather than decreasing the inside diameter.

It has been found that the length of the flat surface L1 should be relatively short in comparison to the thickness of the shank in order for the rivet to be suitable for riveting high strength steel or thick stack steel a ratio of L1:L3 in the range 0.33 to 0.66 produces the best results. Preferably the ratio L1:L3 is 0.5 or 0.6.

In one example, the shank of the rivet of FIGS. 4 to 6 or FIGS. 7 and 8 has an outside diameter Do of 5.5 mm and an inside diameter Di of 2.9 mm. This results in the difference between the diameters (Do minus Di) being 2.6 mm. The ratio of this difference (i.e. twice the shank thickness) to the outside diameter is therefore 0.473. This compares to a ratio in the range of 0.340 to 0.437 for conventional rivet designs of a comparable size. The cross-sectional area of the shank in this region is 17.15 mm$^2$. A comparable conventional rivet has a cross-sectional area of no larger than 14.2 mm$^2$. It is anticipated that in the present invention the ratio of the shank thickness to outside diameter can be increased to 0.517 without impairing the ability of the shank to flare sufficiently. The cross-sectional area may be in the range 16.0 mm$^2$ to 22.0 mm$^2$. The ratio of the cross-sectional area of the shank (in the hollow region) to the outside diameter of the rivet is 3.1:1 which compares to a ratio of 2.4:1 to 2.8:1 in prior art rivets of this kind. The head of the rivet has a diameter of 7.75 mm and this ensures that the rivet is small enough to be used with existing rivet setting and feeding equipment and is consistent with design guidelines for the space required for the rivet and the access of the application tooling. The ratio of the diameter of the rivet head to the outside diameter of the shank is 1.4:1. This compares to a ratio of 1.5:1 for conventional self-piercing rivets.

The rivet is preferably made from a medium carbon manganese-boron steel e.g. conforming to British Standard BS EN 10263 that has been heat treated in a conventional manner to achieve a hardness of at least 350 Hv. Alternatively, the self-piercing rivet could be made from aluminum alloy of the 7000 series or from stainless steel.

Figure 9:
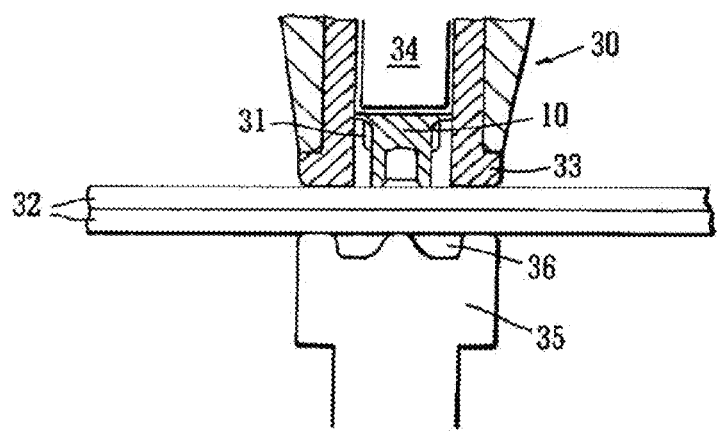
FIG. 9 is a part-sectioned view showing the rivet of FIGS. 4 to 6 ready for insertion into sheet material using a punch and a die.

FIG. 9 shows the rivet 10 of FIGS. 4 to 6 held in the nose 30 of a rivet setter by centering elements 31 (e.g. a plurality of spring centering balls) ready for insertion into overlapping sheets 32, at least one of which is material of the type mentioned need to clarify this statement. The rivet setter comprises a clamping ring 33 and a punch 34 by which the rivet is inserted. The rivet setter may be hydraulically or electrically actuated. The sheet material 32 is supported over a die 35 opposite the punch and may first be clamped before the punch inserts the rivet in accordance with the method described in our U.S. Pat. No. 5,752,305, the content of which is incorporated herein by reference. As the rivet is inserted the material deforms into a suitably shaped cavity 36 in the die. In some embodiments, the sheet 32 of high strength steel may have a thickness in the range 1 to 4 mm. Alternatively, it may be no greater than 6 mm.

Figure 10:
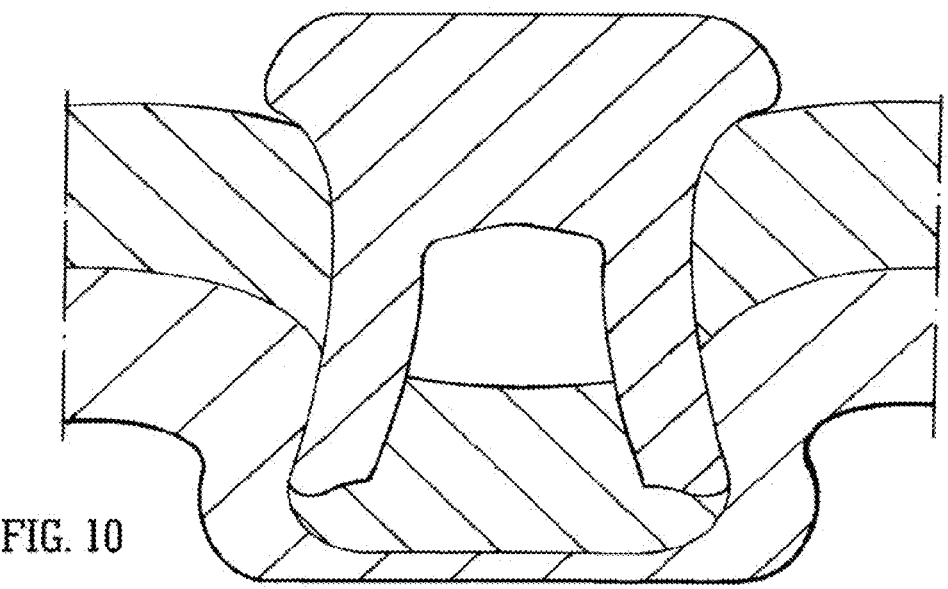
FIG. 10 is a section through a joint formed by inserting the rivet of FIGS. 7 and 8 into sheet material using the punch and die of FIG. 9.

FIG. 10 shows a completed joint in which the rivet of FIGS. 7 and 8 has been inserted into overlapping sheets of high strength steel of relatively low ductility with an ultimate tensile strength (ITS) of approx. 600 Mpa, both sheets having a thickness of 2.6 mm. An insertion force of 47 kN was used. It can be seen that the deformation of the rivet shank is substantially uniform around the rivet and there is no buckling. The degree of flare of the shank and the undercut in the bottom sheet is sufficient to provide satisfactory mechanical properties of the joints. A visual inspection will show that there is no significant separation of the sheets from one another and no clearance between the outside of the shank and the sheets which indicates that the joint will exhibit satisfactory dynamic performance. The thicker shank of the rivet in comparison to its outside diameter improves the column strength such that the rivet can withstand the high forces required to pierce and form the joint in the high strength steel. However, it has been established that the increased thickness must be selected carefully in relation to the outside diameter as it is a factor in ensuring that the rivet shank has the capacity to flare outwardly during insertion and to provide sufficient interlock with the sheets when upset in a suitable die. It has been realized that for high strength steels or thick stack joints adequate joint strength is achieved with a lower degree of flare than would be necessary for conventional riveted joints.

The thicker shank and the depth W are selected to ensure that the rivet is not compressed in height significantly during the rivet insertion operation and will be discernable from an inspection of FIG. 10.

The radii on the outside and inside of the shank are designed to withstand the initiation of cracking and are greater than for conventional rivets. When a self-piercing rivet is inserted by a punch there is a reaction force such that the rivet tends to spring back producing high tensile forces in the areas described above.

It has been determined that the rivet is particularly suitable for joining high strength steels having an ultimate tensile strength in the range 200 to 1400 MPa, the total thickness of the stack being in the range 2.5 to 7 mm and no sheet being greater than 4 mm in thickness. In some tests successful joints have been achieved in a stack thickness of 8 mm. The joint may comprise such a rivet used to join a single sheet of this type to any other type of sheet material suitable for riveting, in which case the total thickness of the sheet stack is in the range 4 to 18 mm. Similarly the rivet is suitable for joining thick stacks of more conventional sheet materials in which the total thickness of the stack is between 4 mm and 18 mm.

It is considered that a satisfactory riveted joint of the kind shown in FIG. 10 cannot be made with any conventional rivet designs.

Tests were conducted on two prior art rivets and a rivet embodying the present invention and the results, depicted in FIGS. 11A to 11E, illustrate the benefits of the present invention.

In all three cases the tests were performed by inserting a hardened steel rivet into overlapping high strength steel sheets having an ultimate tensile strength of 600 MPa and a thickness of 2.6 mm. Each rivet has the same head diameter (7.75 mm) and effective length (7.0 mm) and is upset using a Henrob die (part number DF10-250) and applying a clamping force of 100 bar both before and during rivet insertion. All three rivet types were hardened using a conventional in-line continuous process comprising the steps of subjecting the rivet to an austenising heat treatment, a rapid oil quench and tempering to achieve a final hardness in the range 530-580 Hv and a tensile strength of approximately 1900 MPa.

Figure 11A:
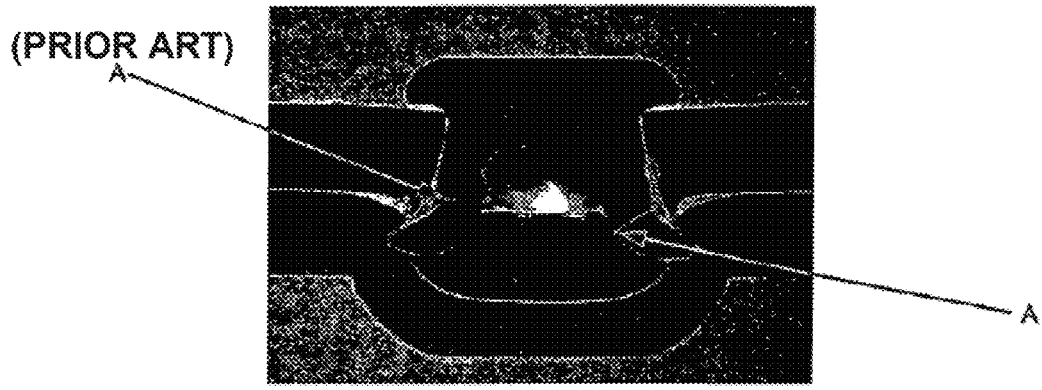
FIG. 11A is a photograph of a section cut through a riveted joint made in high strength steel with a first prior art rivet.

In FIGS. 11A and 11D the prior art rivet (Henrob rivet type K50746P) has a shank with an outside diameter of 5.3 mm and an inside diameter of 3.2 mm giving a ratio of shank thickness to outside diameter of 0.4:1. It can be seen that the rivet has insufficient column strength resulting in collapse and fracture (indicated by arrows A) in the finished joint. Moreover, premature and/or excessive flaring of the end of the shank has caused gaps (one example indicated by arrow B) to appear between the shank and the sheets.

Figure 11B:
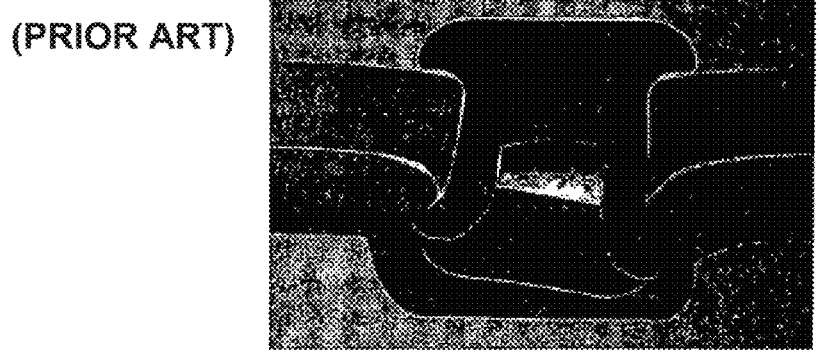
FIG. 11B is a photograph of a section cut through a riveted joint made in high strength steel with a second prior art rivet.

In FIGS. 11B and 11E the prior art rivet (Henrob rivet type P50746) has a shank with an outside diameter of 5.1 mm and an inside diameter of 2.9 mm. The ratio of the thickness of the shank to the outside diameter is 0.43. Despite the shank being thicker than that of the rivet of FIG. 11A, it is clear from the finished joint that it has insufficient column strength that has lead to partial collapse and fracture (see arrow C). Again sheet to shank gaps are apparent (one example indicated by arrow D) as a result of premature or excessive flaring.

Figure 11C:
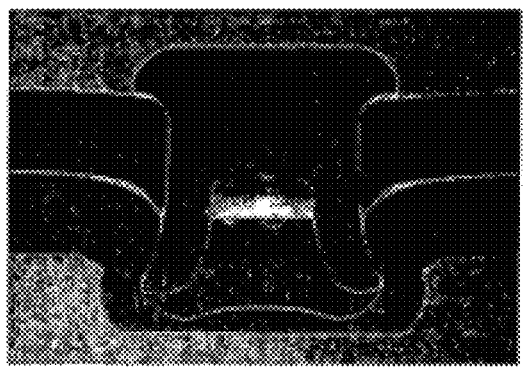
FIG. 11C is a photograph of a section cut through a riveted joint made in high strength steel with a rivet in accordance with the present invention.

In FIG. 11C a rivet embodying the present invention has a shank with an outside diameter of 5.5 mm, an inside diameter of 2.9 mm (giving a shank thickness to outside diameter ratio of 0.47) and a tip geometry as depicted in FIG. 5A. It can be seen that the rivet has sufficient column strength to pierce the top sheet and penetrate into the bottom sheet without collapse. Moreover, the geometry is such that premature or excessive flaring of the end of the shank is prevented as evidenced by the lack of fracturing, but the ductility is sufficient to allow interlock with the lower sheet. In particular the geometry of the rivet ensures that the shank only starts to flare once it has penetrated the upper sheet such that there are no significant gaps between the sheets and the shank. The final joint has sufficient interlock between the rivet and the sheets to provide satisfactory mechanical properties.

Through its enhanced column strength and geometry, the rivet of the present invention is designed to tolerate the variations in strength characteristics in steel of a given grade in industry.

It is to be understood that the rivet of the present invention may be used to join both thin and thick sheet combinations.

It will be appreciated that numerous modifications to the above described design may be made without departing from the scope of the invention as defined in the appended claims. For example, the rivet design may be realized in an alternative material, may be used to join more than two sheets, may be applied to other materials or may be adapted to include a threaded stud formed on its head for insertion into a single sheet.

What is claimed is:

1. A method for forming a joint in at least one high strength sheet steel using a self-piercing rivet comprising the steps of: positioning the at least one high strength sheet steel over a die; providing a rivet having a substantially cylindrical shank and a head, the shank having a central blind bore and an annular piercing end spaced from said head, the ratio of the difference between the outside and inside diameters of the shank in the region around the bore to the outside diameter of the shank is in the range 0.47 to 0.52; positioning a rivet over the at least one high strength sheet steel at a position opposite the die; using a punch to set the rivet and force the rivet into the at least one high strength sheet steel such that the rivet pierces an upper surface thereof and such that the shank deforms outwardly to interlock with the at least one high strength sheet steel but without penetration to a die side of the at least one high strength sheet steel.

2. A method according to claim 1, used to join a plurality of sheets of high strength sheet steel, the rivet penetrating an uppermost sheet and deforming so as to join all of the sheets together, but not penetrating a lowermost sheet at least.

3. A method according to claim 2, wherein the total thickness of the sheets being joined is in a region 2.5 to 7 mm.

4. A method according to claim 2, wherein the total thickness of the sheets being joined is in a region 2.5 to 8 mm.

5. A method according to claim 1, wherein the, or each, sheet of high strength sheet steel has a thickness of no greater than 4 mm.

6. A method according to claim 1, wherein the, or each, sheet of high strength sheet steel has a thickness of no greater than 6 mm.

7. A method according to claim 1, wherein the rivet material is aluminum or aluminum alloy.

8. A method for forming a joint between at least one high strength sheet steel and a sheet of different material using a self-piercing rivet comprising the steps of: positioning the at least one high strength sheet steel and the sheet of different material over a die; providing a rivet having a substantially cylindrical shank and a head, the shank having a central blind bore and an annular piercing end spaced from said head, the ratio of the of the difference between the outside and inside diameters of the shank in the region around the bore to the outside diameter of the shank is in the range 0.47 to 0.52; positioning a rivet over the at least one high strength sheet steel and the sheet of different material at a position opposite the die; using a punch to set the rivet and force the rivet into the at least one high strength sheet steel and the sheet of different material such that the rivet pierces an upper surface thereof and such that the shank deforms outwardly to interlock with the at least one high strength sheet steel and the sheet of different material but without penetration to a die side of the at least one high strength sheet steel and the sheet of different material.

9. A method according to claim 8, wherein the total thickness of the stack of material being joined is in the range 4 mm to 18 mm.

10. A method according to claim 8, wherein the sheet of high strength steel has a thickness in the range 1 to 4 mm.

11. A method according to claim 8, wherein the sheet of high strength steel has a thickness in the range 1 to 6 mm.

12. A method for forming a joint in a plurality of sheets of material, the combined thickness of the sheets being in the range 4 mm to 18 mm using a self-piercing rivet comprising the steps of: positioning the plurality of sheets of material over a die; providing a rivet having a substantially cylindrical shank and a head, the shank having a central blind bore and an annular piercing end spaced from said head, the ratio of the difference between the outside and the inside diameters of the shank in the region around the bore to the outside diameter of the shank is in the range 0.47 to 0.52; positioning a rivet over the sheet material at a position opposite the die; using a punch to set the rivet and force the rivet into the plurality of sheets of material such that the rivet pierces an upper surface thereof and such that the shank deforms outwardly to interlock with the plurality of sheets of material but without penetration to a die side of the material.

13. A method for manufacturing a product by forming a joint in at least one high strength sheet steel using a self-piercing rivet comprising the steps of: positioning the at least one high strength sheet steel over a die; providing a rivet having a substantially cylindrical shank and a head, the shank having a central blind bore and an annular piercing end spaced from said head, the ratio of the difference between the outside and inside diameters of the shank in the region around the bore to the outside diameter of the shank is in the range 0.47 to 0.52; positioning a rivet over the at least one high strength sheet steel at a position opposite the die; using a punch to set the rivet and force the rivet into the at least one high strength sheet steel such that the rivet pierces an upper surface thereof and such that the shank deforms outwardly to interlock with the at least one high strength sheet steel but without penetration to a die side of the at least one high strength sheet steel.

14. A method for manufacturing a product by forming a joint between at least one high strength sheet steel and a sheet of different material using a self-piercing rivet comprising the steps of: positioning the at least one high strength sheet steel and the sheet of different material over a die; providing a rivet having a substantially cylindrical shank and a head, the shank having a central blind bore and an annular piercing end spaced from said head, the ratio of the of the difference between the outside and inside diameters of the shank in the region around the bore to the outside diameter of the shank is in the range 0.47 to 0.52; positioning a rivet over the at least one high strength sheet steel and the sheet of different material at a position opposite the die; using a punch to set the rivet and force the rivet into the at least one high strength sheet steel and the sheet of different material such that the rivet pierces an upper surface thereof and such that the shank deforms outwardly to interlock with the at least one high strength sheet steel and the sheet of different material but without penetration to a die side of the at least one high strength sheet steel and the sheet of different material.

15. A method for manufacturing a product by forming a joint in a plurality of sheets of material, the combined thickness of the sheets being in the range 4 mm to 18 mm using a self-piercing rivet comprising the steps of: positioning the plurality of sheets of material over a die; providing a rivet having a substantially cylindrical shank and a head, the shank having a central blind bore and an annular piercing end spaced from said head, the ratio of the difference between the outside and inside diameters of the shank in the region around the bore to the outside diameter of the shank is in the range 0.47 to 0.52; positioning a rivet over the plurality of sheets of material at a position opposite the die; using a punch to set the rivet and force the rivet into the plurality of sheets of material such that the rivet pierces an upper surface thereof and such that the shank deforms outwardly to interlock with the plurality of sheets of material but without penetration to a die side of the plurality of sheets of material.

* * * * *